United States Patent [19]

Ducos et al.

[11] Patent Number: 5,268,557
[45] Date of Patent: Dec. 7, 1993

[54] RECHARGING BEAD INCORPORATING FIBRES OR AT LEAST ONE REINFORCING WIRE

[75] Inventors: Maurice Ducos, Mornas; Robert Tell, Bollene, both of France

[73] Assignee: SNMI Societe Nouvelle de Metallisation Industries, France

[21] Appl. No.: 806,660

[22] Filed: Dec. 13, 1991

[30] Foreign Application Priority Data

Jan. 9, 1991 [FR] France .................. 91 00192

[51] Int. Cl.$^5$ .............................................. B23K 35/22
[52] U.S. Cl. .................... 219/145.23; 219/76.1
[58] Field of Search ........... 219/73.21, 146.51, 145.32, 219/76.1, 145.23

[56] References Cited

U.S. PATENT DOCUMENTS

| | | | |
|---|---|---|---|
| 3,503,844 | 3/1970 | Clement | 161/175 |
| 4,625,095 | 11/1986 | Das | 219/137 WM |
| 5,004,886 | 4/1991 | Born et al. | 219/146.51 |

FOREIGN PATENT DOCUMENTS

| | | |
|---|---|---|
| 1443142 | 5/1966 | France . |
| 2081169 | 12/1971 | France . |
| 2174752 | 10/1973 | France . |
| 2255991 | 7/1975 | France . |

*Primary Examiner*—Clifford C. Shaw
*Attorney, Agent, or Firm*—Pearne, Gordon, McCoy & Granger

[57] ABSTRACT

The invention relates to a recharging or reloading bead incorporating discontinuous fibres or at least one reinforcing wire.

This bead comprises a core reinforced by discontinuous fibres or at least one continuous wire (6) made from a non-fragile material, which melts or burns at a temperature equal to or above 500° C., e.g. a weldable alloy or metal, such as copper or stainless steel. It also comprises an outer sheath (9b) made from an organic substance.

It can be produced by the co-extrusion or co-spinning of two pastes.

11 Claims, 1 Drawing Sheet

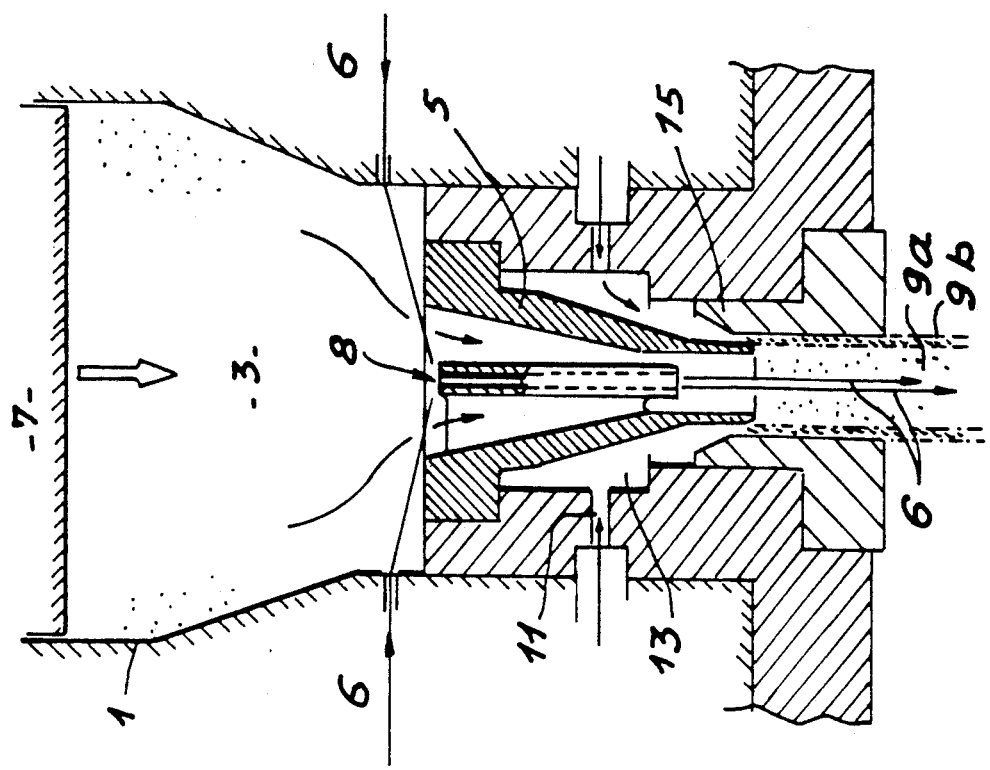
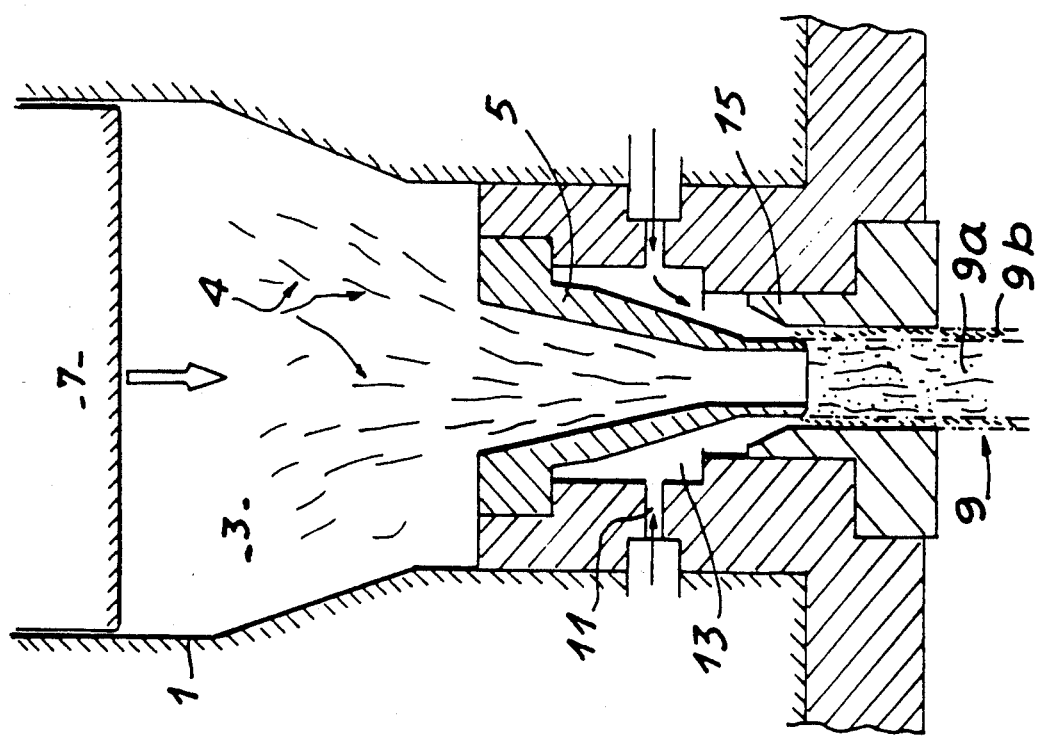

RECHARGING BEAD INCORPORATING FIBRES OR AT LEAST ONE REINFORCING WIRE

The present invention relates to recharging or reloading cords, more particularly intended for producing a covering by recharging using an external thermal power source, such as a flame or an electric arc, e.g. an oxyacetylene torch, a torch or TIG (Transfer Inert Gas) welding torches, or any other electronic bombardment or plasma welding means.

More specifically, it relates to a flexible cord usable as a recharging material and which has an inner core formed by a mineral powder agglomerated by an organic binder and an outer sheath made from an organic material. Recharging cords of this type are e.g. described in FR-A-1 443 142, FR-A-90 379, FR-A-2 081 169 and FR-A-2 255 991.

When these flexible cords are used in a torch, the organic binder of the core and the outer organic sheath are consumed in the heat source, whilst the powder forms on the support which receives it a uniform covering, having a high level of purity and good metallic characteristics. In order to ensure the cohesion between the mineral powder grains during the elimination of the organic binder and prior to the melting of the grains, it is possible to add to the core a small proportion of a mineral compound such as sodium silicate. It is also possible to add a mineral compound to the sheath, which makes it possible to incorporate partly unmeltable ceramic grains into the core, whilst maintaining their cohesion up to melting of the meltable part of the core.

However, in the case of welding-type and particularly dense recharging cords, e.g. having tungsten carbide particles with a large grain size in a metal matrix, an undesirable phenomenon occurs when recharging is interrupted, when the outer sheath and the binder have been eliminated over a length of 15 to 25 mm from the end of the cord. Thus, in this case the end from which the already burned sheath and organic binder have been removed, is detached from the remainder of the cord under the action of its own weight, due to the lack of binder between the unmeltable particles. The detached end cannot be recovered, because it is too small to be reused and this leads to a by no means negligible material loss.

This more particularly occurs when the operator interrupts the recharging operation in order to force the cord into the insulating sleeve enabling him to place the cord in position on the part to be covered without burning, or when the operator has finished a covering and removes the cord from the heat source.

The object of the present invention is to provide a flexible recharging cord making it possible to obviate this disadvantage.

According to the invention the recharging or reloading cord incorporates a core formed from a mineral powder agglomerated by an organic binder and an outer sheath made from an organic material. It is characterized in that the core is reinforced by discontinuous fibers or by at least one continuous wire with a diameter of 50 to 200 μm made from a non-fragile material, which melts or burns at a temperature equal to or higher than 500° C., said fibers or said wire or wires making it possible to ensure that the end of the recharging cord is not detached when it no longer has any organic binder and sheath over a length of 15 to 25 mm.

According to the invention, the non-fragile material constituting the fibers or the wire or wires is chosen so as not to disturb the recharging or reloading operation and so as not to prejudicially modify the physical and metallurgical characteristics of the covering deposited from said cord. In particular, said material must not react with the mineral powder used. Preferably, the material of the fibers or wires is a weldable alloy or metal, e.g. steel, copper or nickel.

The presence of these discontinuous fibers or continuous wires within the core makes it possible to join the mineral powder in the absence of a binder and organic material sheath. When the recharging is interrupted with the cord end free from sheath and organic binder, because they have already burned in the recharging device an adequate connection is obtained between said cord end and the remainder of the core, so as to prevent said end becoming detached and lost.

According to a first embodiment of the invention use is made of discontinuous fibers. The length of these discontinuous fibers must be adequate to permit an anchoring of the end of the bead free from the binder and sheath in the remainder of the core. However, the length of the discontinuous fibers must not be excessive in order not to disturb the core production operations and in particular the mixing of the mineral powder with the organic binder. Generally use is made of fibers with a length of 10 to 50 mm, e.g. 30 mm.

The diameter of the discontinuous fibers must be adequate to ensure that they have an appropriate mechanical strength to withstand the weight of the end of the cord at the combustion temperature of the organic binder and the sheath, but must not be so high as to prejudice the flexibility of the cord. Generally fibers with a diameter of 50 to 200 μm are used.

In the same way the core fiber content must be adequate to ensure that all the fibers can support the weight of the cord end. However, this content must also not be so high that it disturbs the core production operation and in particular the mixing of the mineral powder and the organic binder and must not be prejudicial to flexibility. This fiber content is dependent on the cross-section of the cord, the density of the mineral powder used and the nature of the fibers used.

For a core diameter of approximately 6.35 mm, the fibers can e.g. represent 0.20 to 0.50% by weight of the core, when the mineral powder density is approximately 7.8 and the fibers are of stainless steel or copper.

In the two embodiments of the recharging cord according to the invention, the mineral powder constituting the core can be of different types. For example, it can be constituted by metal alloys based on nickel or cobalt, alloys of the hard solder type, such as nickel or copper solders, alloys based on iron, which can be used alone or with ceramic material charges such as carbides, nitrides, silicides and oxides. In the latter case, the ceramic material can be present in the powder in the form of particles of different sizes, including sizes e.g. up to 6 mm.

The mineral powder forming the core can also incorporate inorganic material additives, e.g. a mineral compound making it possible to ensure the cohesion of the powder particles until they have completely melted at the combustion temperature of the organic binder and as described in FR-A-2 081 169. However, with the discontinuous fibers or continuous wires according to the invention, it is possible to avoid the use of such a compound.

In the internal core, the mineral powder, which can comprise a metal powder and ceramic particles, is agglomerated by an organic binder also optionally incorporating a plasticizer and/or other additives.

The organic binders used can in particular be cellulose binders, e.g. hydroxyethylmethyl cellulose, methyl cellulose, carboxymethyl cellulose or polymers such as polyvinyl alcohol and polymethacrylic acid.

The plasticizing agents used can e.g. be ammonium stearate, diglycol stearate and glycerin.

In the first embodiment of the invention it is possible to prepare the core by mixing the mineral powder with the discontinuous reinforcement fibers and the organic binder, e.g. using conventional bladed kneaders or mixers. This gives a paste, which can be brought into the form of a cord by extrusion or spinning. The outer organic material sheath is prepared from a similar paste containing the organic substance and the sheathed cord can be produced by co-extrusion or co-spinning the two pastes.

In the second embodiment of the invention, it is possible to prepare the core by using a paste formed by mineral powder mixed with the organic binder, which underoges extrusion, whilst entraining the continuous reinforcing wires in the extruded paste. The outer sheath can be prepared from a similar paste containing the organic substance and placed around the core by co-extrusion.

The organic substances used for producing the outer sheath can be cellulose derivatives such as hydroxyethylmethyl cellulose.

The invention is described in greater detail hereinafter relative to non-limitative embodiments and the attached drawings, wherein show:

FIG. 1: diagrammatically an apparatus for the co-extrusion of a card according to the first embodiment of the invention.

FIG. 2: diagrammatically an apparatus for the co-extrusion of a recharging or reloading cord according to the second embodiment of the invention.

EXAMPLE 1

This example relates to the production of a recharging cord according to the first embodiment of the invention, whose core is of cermet based on the alloy Ni-Cr-B-Si and tungsten carbide particles reinforced by copper fibres. The Ni-Cr-B-Si alloy contains 68% Ni, 17% Cr, 3% B and 2% Si.

A first paste having the following composition is firstly prepared:

| | |
|---|---|
| Ni—Cr—B—Si alloy | 100 parts by weight |
| melted tungsten carbide (average particle diameter 1.6 mm) | 110 parts by weight |
| tungsten carbide (average particle diameter 0.1 mm) | 50 parts by weight |
| glass fibers | 1.1 parts by weight |
| binder | 5.5 parts by weight |
| plasticizers | 0.5 parts by weight |
| copper fibers (diameter 100 μm, length 15 mm) | 1.4 parts by weight |

This paste is prepared by mixing the different constituents with the binder (hydroxyethylmethyl cellulose), followed by the addition of an adequate quantity of water and vigorous mixing for 15 minutes.

A second paste is prepared, which is to be used for forming the sheath, by mixing the mixture having the following composition: 100 parts by weight of hydroxyethylmethyl cellulose in powder form, 10 parts by weight of sodium silicate, 4 parts by weight of triethanol amine and an adequate quantity of water.

These two pastes are then co-extruded in the extruder shown in FIG. 1. It can be seen that the extruder has a container 1 into which is introduced the first paste 3 containing the discontinuous fibres 4, which is forced into the first conical nozzle 5 under the action of the piston 7 in order to form the core 9a of the cord 9. The second paste is introduced by the pipes 11 into the space 13 and is then forced into the second nozzle 15 arranged around the first nozzle 5 in order to form the organic sheath 9b around the core 9a Thus, a cord is obtained, which is reinforced by discontinuous copper fibres incorporating a hydroxyethylmethyl cellulose sheath.

When this cord is used for producing a recharge or reload with an oxyacetylene torch, the cord end is not detached when the covering or coating operation is interrupted.

EXAMPLE 2

A recharging cord is prepared following the same operating procedure as in example 1, but using the following components for producing the first paste:

| | |
|---|---|
| Ni—Cr—B—Si alloy | 100 parts by weight |
| tungsten carbide (average diameter 1.6 mm) | 95 parts by weight |
| tungsten carbide (average diameter 0.1 mm) | 46 parts by weight |
| binder | 5.1 parts by weight |
| stainless steel fibers NFZ2CN18-10 (diameter 120 μm, length 30 mm) | 1,4 parts by weight |

The same second paste as in example 1 is used for preparing the outer sheath.

With the thus obtained cord, the cord end is not detached when the recharging operation is interrupted.

EXAMPLE 3

This example relates to the production of a recharging or reloading cord according to the second embodiment of the invention and which has a cermet core based on a copper alloy (CuZnNi) and fritted tungsten carbide reinforced by two continuous steel wires. The CuZnNi alloy contains 50% copper, 40% zinc and 10% nickel.

A first paste having the following composition was prepared first:

| | |
|---|---|
| CuZnNi alloy | 100 parts by weight |
| tungsten carbide (average diameter 3.17 mm) | 160 parts by weight |
| organic binder | 5.5 parts by weight. |

This first paste is prepared by mixing the different constituents with 4% by weight of the binder (hydroxyethylmethyl cellulose), followed by the addition of 10% by weight of hydroxyethylmethyl cellulose (RHODOPAS 956) and finally an adequate quantity of water. This is followed by vigorous mixing for 1 hour.

This is followed by the preparation of a second paste to be used for forming the sheath by mixing the mixture with the following composition:
100 parts by weight of hydroxyethylmethyl cellulose 10 parts by weight of RHODOPAS adequate quantity of water.

These two pastes are then extruded in the extruder shown in FIG. 2 and which is identical to that of FIG. 1. Therefore the same references are used for designating the same elements. However, the extruder of FIG. 2 also has a means for introducing the two reinforcing wires 6 at the first inner nozzle 5 and a tube 8 for guiding these wires in the first paste. This example uses two stainless steel 2rCND 18-10 wires with a diameter of 100 μm.

In this case, there is a prior introduction of the two wires 6 into the extruder container, guiding them in the tube 8 and pulling them so that they only project slightly from the outlet of the outer nozzle 15. The first paste is then placed in the container 1 and the second paste is introduced into the space 13 to carry out the co-extrusion of the two pastes, which entrain the two wires 6 in the inner core 9a leaving the extruder.

This gives a cord reinforced by two continuous steel wires. During the use of the cord for recharging a part, the cord end is not detached when the coating operation is interrupted. However, the presence of these two small diameter wires does not make it possible to ensure an adequate flexibility and cohesion of the cord in the absence of the outer organic material sheath.

We claim:

1. A reloading cord for thermal deposition on a support, said cord having increased cord integrity which reduces the occurrence of cord breakage or end portion detachment, said cord comprising a core and an outer sheath of an organic material surrounding said core, said core including a mineral powder, reinforcing means and an organic binder, said reinforcing means comprising discontinuous, non-fragile, weldable alloy or metal fibres having a diameter of 50 to 200 μm and a melting temperature or a burning temperature at least equal to 500° C., whereby detachment of an end portion of the cord due to its own weight from the remainder of the cord is substantially avoided following elimination of the organic binder and the sheath over a length of 15 to 25 mm from an adjacent end of the cord.

2. A cord according to claim 1, wherein the fibres are made from stainless steel or copper.

3. Bead according to claim 1, wherein the fibres are 10 to 50 mm long.

4. A cord according to claim 3, wherein the diameter of the fibres is 50 to 200 μm.

5. A cord according to either of the claims 3 or 4, wherein the fibres represent 0.20 to 0.50% by weight of the cord.

6. A reloading cord for thermal deposition on a support, said cord having increased cord integrity which reduces the occurrence of cord breakage or end portion detachment, said cord comprising a cord and an outer sheath of an organic material surrounding said cord, said core including a mineral powder, reinforcing means and an organic binder, said reinforcing means comprising at least one continuous, non-fragile, weldable alloy or metal wire having a diameter of 50 to 200 μm and a melting temperature or a burning temperature at least equal to 500° C., whereby detachment of an end portion of the cord due to its own weight from the remainder of the cord is substantially avoided following elimination of the organic binder and the sheath over a length of 15 to 25 mm from an adjacent end of the cord.

7. A cord according to either of claims 1 or 6, wherein the mineral powder of the core is constituted by a metal alloy or metal powder and particles of at least one ceramic material.

8. A cord according to claim 7, wherein the mineral powder is formed by a nickel-chromium-boron-silicon alloy powder, tungsten carbide particles and glass fibres.

9. A cord according to claim 7, wherein the mineral powder is formed by a nickel-chromium-boron-silicon alloy powder and tungsten carbide particles.

10. A cord according to claim 6, wherein the core comprises 1 to 3 continuous reinforcing wires.

11. A cord according to claim 6, wherein said at least one wire is made from stainless steel or copper.

* * * * *